(12) United States Patent
Pope et al.

(10) Patent No.: US 10,686,731 B2
(45) Date of Patent: Jun. 16, 2020

(54) NETWORK INTERFACE DEVICE

(71) Applicant: XILINX, INC., San Jose, CA (US)

(72) Inventors: Steven L. Pope, Cambridge (GB);
Derek Roberts, Cambridge (GB);
David J. Riddoch, Huntingdon (GB);
Dmitri Kitariev, Costa Mesa, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/226,453

(22) Filed: Dec. 19, 2018

(65) Prior Publication Data

US 2019/0190853 A1  Jun. 20, 2019

Related U.S. Application Data

(63) Continuation-in-part of application No. 15/847,778, filed on Dec. 19, 2017.

(51) Int. Cl.
*H04L 12/931* (2013.01)
*H04L 12/883* (2013.01)
*H04L 12/935* (2013.01)
*H04L 29/06* (2006.01)
*H04L 12/933* (2013.01)
*H04L 12/721* (2013.01)

(52) U.S. Cl.
CPC ............ *H04L 49/506* (2013.01); *H04L 45/66* (2013.01); *H04L 49/101* (2013.01); *H04L 49/103* (2013.01); *H04L 49/30* (2013.01); *H04L 49/9021* (2013.01); *H04L 69/161* (2013.01)

(58) Field of Classification Search
CPC ......... H04L 49/30; H04L 43/14; H04L 45/38; H04L 45/66; H04L 49/101; H04L 49/103; H04L 49/506; H04L 49/9021; H04L 63/1416; H04L 63/1458; H04L 63/166; H04L 67/10; H04L 67/2861; H04L 69/16; H04L 69/161; G06F 16/213; G06F 2209/509; G06F 9/5044; G06N 20/00
See application file for complete search history.

(56) References Cited

U.S. PATENT DOCUMENTS 4,905,234 A  2/1990  Childress et al.
5,612,950 A  3/1997  Young
(Continued)

OTHER PUBLICATIONS

U.S. Appl. No. 15/847,742—Office Acton dated Jul. 16, 2019, 32 pages.
(Continued)

*Primary Examiner* — June Y Sison
(74) *Attorney, Agent, or Firm* — Haynes Beffel & Wolfeld, LLP; Paul A. Durdik

(57) ABSTRACT

Roughly described: a network interface device has an interface. The interface is coupled to first network interface device circuitry, host interface circuitry and host offload circuitry. The host interface circuitry is configured to interface to a host device and has a scheduler configured to schedule providing and/or receiving of data to/from the host device. The interface is configured to allow at least one of: data to be provided to said host interface circuitry from at least one of said first network device interface circuitry and said host offload circuitry; and data to be provided from said host interface circuitry to at least one of said first network interface device circuitry and said host offload circuitry.

17 Claims, 10 Drawing Sheets

(56) References Cited

U.S. PATENT DOCUMENTS

| | | | |
|---|---|---|---|
| 5,937,169 A | 8/1999 | Connery et al. | |
| 6,591,302 B2 | 7/2003 | Boucher et al. | |
| 6,965,941 B2 | 11/2005 | Boucher et al. | |
| 7,688,838 B1 | 3/2010 | Aloni et al. | |
| 7,818,563 B1 | 10/2010 | Dwork et al. | |
| 7,835,380 B1 | 11/2010 | Aloni et al. | |
| 8,346,919 B1 | 1/2013 | Eiriksson et al. | |
| 8,473,316 B1 | 6/2013 | Panzitta et al. | |
| 8,789,135 B1 | 7/2014 | Pani | |
| 9,407,426 B2 | 8/2016 | Blumenthal et al. | |
| 9,456,060 B2 | 9/2016 | Pope et al. | |
| 2002/0174240 A1 | 11/2002 | Nason et al. | |
| 2003/0117958 A1 | 6/2003 | Nation et al. | |
| 2004/0010712 A1 | 1/2004 | Hui et al. | |
| 2004/0054813 A1 | 3/2004 | Boucher et al. | |
| 2004/0073716 A1 | 4/2004 | Boom et al. | |
| 2005/0010819 A1 | 1/2005 | Williams et al. | |
| 2005/0088969 A1* | 4/2005 | Carlsen | H04L 49/30 370/229 |
| 2005/0125694 A1 | 6/2005 | Fakes et al. | |
| 2006/0023705 A1 | 2/2006 | Zoranovic et al. | |
| 2006/0026679 A1 | 2/2006 | Zakas | |
| 2006/0174242 A1 | 8/2006 | Zhu et al. | |
| 2007/0067497 A1 | 3/2007 | Craft | |
| 2007/0150954 A1 | 6/2007 | Shon | |
| 2007/0174841 A1* | 7/2007 | Chamberlain | G06F 9/3879 719/310 |
| 2007/0209069 A1 | 9/2007 | Saklikar et al. | |
| 2007/0214504 A1 | 9/2007 | Milani Comparetti et al. | |
| 2008/0005776 A1 | 1/2008 | VerSteeg et al. | |
| 2008/0025515 A1 | 1/2008 | Coombs | |
| 2008/0140574 A1 | 6/2008 | Boucher et al. | |
| 2008/0189373 A1 | 8/2008 | Ikonen et al. | |
| 2009/0204813 A1 | 8/2009 | Kwan | |
| 2011/0004771 A1 | 1/2011 | Matsushima et al. | |
| 2011/0040897 A1* | 2/2011 | Pope | G06F 9/544 709/250 |
| 2011/0119673 A1 | 5/2011 | Bloch et al. | |
| 2013/0047160 A1 | 2/2013 | Conover | |
| 2013/0054857 A1 | 2/2013 | Horman et al. | |
| 2013/0080567 A1* | 3/2013 | Pope | G06F 13/385 709/213 |
| 2013/0145035 A1 | 6/2013 | Pope et al. | |
| 2013/0325998 A1 | 12/2013 | Hormuth et al. | |
| 2014/0279342 A1 | 9/2014 | Maynard | |
| 2014/0304802 A1 | 10/2014 | Pope et al. | |
| 2014/0310149 A1 | 10/2014 | Singh | |
| 2014/0310405 A1 | 10/2014 | Pope et al. | |
| 2015/0049763 A1 | 2/2015 | Michels et al. | |
| 2015/0372807 A1 | 12/2015 | Khoyi et al. | |
| 2016/0352687 A1 | 12/2016 | Pope et al. | |
| 2016/0373561 A1 | 12/2016 | Pope et al. | |
| 2017/0026497 A1 | 1/2017 | Pope et al. | |
| 2017/0094375 A1 | 3/2017 | Yamada et al. | |
| 2017/0102950 A1 | 4/2017 | Chamberlain et al. | |
| 2017/0185549 A1 | 6/2017 | Pope | |
| 2017/0214775 A1 | 7/2017 | Pope et al. | |
| 2019/0190982 A1 | 6/2019 | Pope et al. | |
| 2019/0199654 A1 | 6/2019 | Pope et al. | |

OTHER PUBLICATIONS

EP 18214016.0-1221—Extended European Search report dated May 8, 2019, 9 pages.

EP 18214201.8-1213—Extended European Search report dated May 17, 2019, 8 pages.

Jang et al., "Implementation of a Hybrid TCP/IP Offload Engine Prototype." In Asia-Pacific Conference on Advances in Computer Systems Architecture, pp. 464-477. Springer, Berlin, Heidelberg, 2005.

U.S. Appl. No. 15/847,778—Office Action dated Sep. 6, 2019, 48 pages.

U.S. Appl. No. 15/847,778—Response to Office Action dated Sep. 6, 2019 filed Dec. 3, 2019, 16 pages.

* cited by examiner

NETWORK INTERFACE DEVICE

CROSS REFERENCE TO OTHER APPLICATIONS

This application is a continuation-in-part of U.S. application Ser. No. 15/847,778, entitled "NETWORK INTERFACE DEVICE" by Steven L. Pope, Derek Roberts, and David J. Riddoch, filed 19 Dec. 2017, which application is incorporated herein by reference in its entirety.

BACKGROUND

Field

This application relates to network interface devices having a field programmable gate array application.

Background

Network interface devices are known and are typically used to provide an interface between a computing device and a network. The network interface device can be configured to process data which is received from the network and/or process data which is to be put on the network.

For some network interface devices, there is a drive to provide increased specializations of designs towards specific applications.

SUMMARY

According to a first aspect, there is provided a network interface device arranged to couple a host computing device to a network, said network interface device comprising: a first interface configured to receive data from the host computing device; a first field programmable gate array application; and a transport engine for processing data, wherein the first interface is configured to: direct at least some of the data received from the host to the first field programmable gate array application; and direct at least some of the data received from the host to the transport engine, wherein the first field programmable gate array application is configured to perform processing with respect to the at least some of the received data.

In one embodiment, the first field programmable gate array application is configured to pass the processed at least some of the data to the transport engine, wherein the transport engine is configured to perform processing of the at least some of the data received from the first field programmable gate array application and cause the processed data to be transmitted over the network.

In one embodiment, the network interface device comprises a second interface between the transport engine and the first field programmable gate array application, wherein the second interface is configured to receive at least one of: protocol processed data packets from the transport engine and data packets from the network, wherein the second interface is configured to pass the received data packets to the first field programmable gate array application for processing.

In one embodiment, in response to processing the received data packets, the first field programmable gate array application is configured to provide processed data packets to at least one of: the transport engine for protocol processing; and the second interface for transmission over the network.

In one embodiment, the network interface device comprises a second field programmable gate array application configured to at least one of: process data received from at least one of: the first interface and the first programmable gate array application; and provide data processed by the second field programmable gate array application to at least one of the: the first interface and the first programmable gate array application.

In one embodiment, the processing of the data received at the second field programmable gate array application comprises writing or reading from a data structure maintained by the second field programmable gate array application.

In one embodiment, the providing data processed by the second field programmable gate array application comprises providing data read from a data structure maintained by the second field programmable gate array application to at least one of: the first interface and the first programmable gate array application.

In one embodiment, in response to receiving a read request from the first interface or the first programmable gate array application, updating the data structure.

In one embodiment, the first interface is configured to direct data packets of a first data flow to the field programmable gate array application and to direct data packets of a second data flow to the transport engine.

In one embodiment, the transport engine is provided by application specific integrated circuit gates within a field programmable gate array also providing said first field programmable gate array application.

In one embodiment, said FPGA is configured to perform one or more of the following: reduce data in one or more flows; aggregate data in one or more flows; perform hybrid processing; detect a DDOS attack; machine learning; perform a software defined networking function; provide an Open Computing Language kernel offload; provide an offload function; and take remedial action against a distributed denial of service attack.

According to a second aspect, there is provided a network interface device arranged to couple a host computing device to a network, said network interface device comprising: a transport engine for performing protocol processing of data packets received from the network, a first field programmable gate array application; a first interface configured to receive processed data packets from the transport engine and to: provide at least some of the processed data packets to the field programmable gate array application for processing.

In one embodiment, the first interface is configured to: provide at least some of the processed data packets to the host computing device without being processed by the application.

In one embodiment, the first field programmable gate array application is configured to process the at least some of the data packets to provide filtering.

In one embodiment, the network interface device comprises: a second field programmable gate array application; a second interface between the transport engine and the second field programmable gate array application, wherein the second interface is configured to provide the data packets received from the network to the second field programmable gate array application, wherein the second field programmable gate array application is configured to process the data packets and provide them to the transport engine.

In one embodiment, the processing by the second field programmable gate array application comprises distributed denial of service (DDOS) mitigation, the first field programmable gate array application maintains a data store, the processing by the first field programmable gate array application comprising updating the data store.

According to a third aspect, there is provided a network interface device arranged to couple a host computing device to a network comprising: a first interface configured to receive data packets from the host computing device, the first interface comprising a first memory and a second memory, wherein the first memory is memory mapped to a shared memory location in the host computing device, wherein the second memory is configured to receive data packets transferred from the host, wherein the network interface device comprises: a field programmable gate array application; and a transport engine for performing protocol processing of data packets, wherein the first interface is configured to provide the data packets in the first memory to the FPGA application for processing by the FPGA application, wherein the first interface is configured to provide the data packets in the second memory to the transport engine for protocol processing.

According to a fourth aspect, there is provided a data processing system comprising: a network interface device according to the third aspect; and a host computing device.

In one embodiment, the FPGA application is configured to provide data to the host computing device, wherein the host computing device is configured to provide flow control over the data provided by the FPGA application to the host computing device.

In one embodiment, the flow control comprises credits based flow control.

In one embodiment, the flow control comprises Xon/Xoff flow control.

According to a fifth aspect, there is provided a data processing system comprising a host computing device and a network interface device arranged to couple the host computing device to a network, the network interface device comprising a field programmable gate array application and a transport engine, the host computing device comprising: one or more processors; a first memory configured to receive data packets for transmission over a network; a second memory configured to receive data packets for delivery to the field programmable gate array application, wherein the second memory is mapped to a memory region on the network interface device associated with the field programmable gate array application; a transmit queue comprising a pointer to a location in the first memory, wherein the one or more processors are configured to transfer data from the first memory at the location pointed to by the pointer to a memory of the network interface device associated with the transport engine.

In one embodiment, the second memory is mapped to the memory region associated with the field programmable gate array application using a wide memory aperture.

According to a sixth aspect, there is provided a network interface device arranged to couple a host computing device to a network comprising: a transport engine for performing protocol processing of data packets; a field programmable gate array application configured to process data packets to be sent over the network, wherein the transport engine is configured to perform protocol processing of data packets to be sent over the network, the network interface device comprising: a second interface configured to: receive data packets protocol processed by the transport engine; and cause the data packets to be transmitted over the network, wherein the second interface is configured to back-pressure the transport engine.

According to a seventh aspect, there is provided a network interface device comprising: an interface comprising a plurality of input ports and a plurality of output ports; first network interface device circuitry having at least one input port and at least one port configured to be coupled to respective ports of the interface; host interface circuitry configured to interface to a host device, said host interface circuitry having at least one input port and at least one output port configured to be coupled to respective ports of the interface, said host interface circuitry comprising a scheduler configured to schedule at least one of the providing of data to the host device and the receiving of data from the host; and host offload circuitry configured to perform an offload operation for the host device, said host offload circuitry having at least one input port and at least one output port configured to be coupled to respective ports of the interface, wherein said interface is configured to allow at least one of: data to be provided to said host interface circuitry from at least one of said first network device interface circuitry and said host offload circuitry; and data to be provided from said host interface circuitry to at least one of said first network interface device circuitry and said host offload circuitry.

The at least one input port and said at least one output port of the host offload circuitry may be connected via the interface only to respective ports of said host interface circuitry.

The network interface device may comprise second network interface device circuitry having at least one input port and at least one output port configured to be coupled to respective ports of the interface, said second network interface device circuitry configured to perform network interface device operations.

The second network interface device circuitry may comprise at least one kernel.

The second network interface device circuitry may be configured to perform at least one of: an accelerator function and a flow steering function.

The at least one input port and said at least one output port of the second network interface device circuitry may be connected via the interface only to respective ports of said first network interface device circuitry.

The host offload circuitry may comprise at least one kernel.

The host offload circuitry may be configured to support a first component of an application, said application component being configured to at least one of provide data to and receive data from a second component of the application, The second component of the application may be provided by said host device.

The first network interface device circuitry may be configured to stream data directly to at least one of a kernel in said network interface device and a kernel in said host device.

The first network interface device circuitry may be configured to stream data to a destination comprising at least one of said second network interface device circuitry and said host device.

The first network interface device circuitry may be configured to receive data from a destination comprising at least one of said second network interface device circuitry and said host device.

The interface may comprise a cross bar switch.

The host interface circuitry may be configured to manage a plurality of queues of data.

According to an eighth aspect, there is provided a system comprising a host device and a network interface device, said network interface comprising: an interface comprising a plurality of input ports and a plurality of output ports; first network interface device circuitry having at least one input port and at least one port configured to be coupled to respective ports of the interface; host interface circuitry configured to interface to the host device, said host interface circuitry having at least one input port and at least one output port configured to be coupled to respective ports of the interface, said host interface circuitry comprising a scheduler configured to schedule at least one of the providing of data to the host device and the receiving of data from the host; and host offload circuitry configured to perform an offload operation for the host device, said host offload circuitry having at least one input port and at least one output port configured to be coupled to respective ports of the interface, wherein said interface is configured to allow at least one of: data to be provided to said host interface circuitry from at least one of said first network device interface circuitry and said host offload circuitry; and data to be provided from said host interface circuitry to at least one of said first network interface device circuitry and said host offload circuitry.

The host may comprise at least one of: at least one application; and a protocol processing function, a plurality of which are configured to offload at least a part of respective functionality to said network interface device.

The host offload circuitry may be configured to provide at least one of said offloaded respective functionality.

In the above, many different embodiments have been described. It should be appreciated that further embodiments may be provided by the combination of any two or more of the embodiments described above.

BRIEF DESCRIPTION OF DRAWINGS

Some embodiments will now be described by way of example only with reference to the accompanying Figures in which.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

When data is to be transferred between two data processing systems over a data channel, such as a network, each of the data processing systems has a suitable network interface to allow it to communicate across the channel. Often the network is based on Ethernet technology. Data processing systems that are to communicate over a network are equipped with network interfaces that are capable of supporting the physical and logical requirements of the network protocol. The physical hardware component of network interfaces is referred to as network interface devices or network interface cards (NICs).

Most computer systems include an operating system (OS) through which user level applications communicate with the network. A portion of the operating system, known as the kernel, includes protocol stacks for translating commands and data between the applications and a device driver specific to the network interface devices, and the device drivers for directly controlling the network interface devices. By providing these functions in the operating system kernel, the complexities of and differences among network interface devices can be hidden from the user level application. In addition, the network hardware and other system resources (such as memory) can be safely shared by many applications and the system can be secured against faulty or malicious applications.

Figure 1:
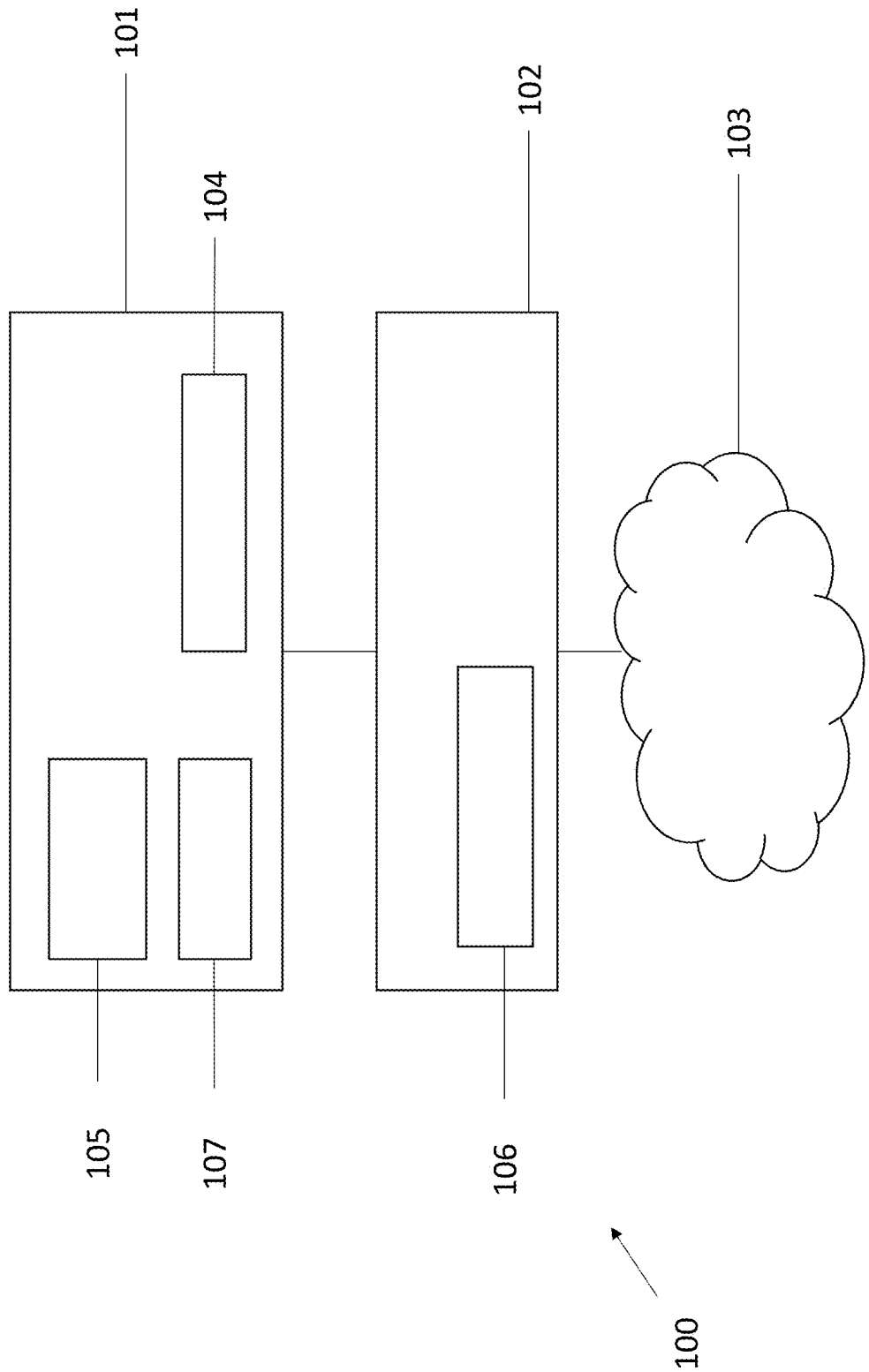
FIG. 1 shows a schematic view of a data processing system coupled to a network.

A typical data processing system 100 for carrying out transmission across a network is shown in FIG. 1. The data processing system 100 comprises a host computing device 101 coupled to a network interface device 102 that is arranged to interface the host to network 103. The host computing device 101 includes an operating system 104 supporting one or more user level applications 105. The host computing device 101 may also include a network protocol stack (not shown). For example, the protocol stack may be a component of the application, a library with which the application is linked, or be provided by the operating system. In some embodiments, more than one protocol stack may be provided.

The network protocol stack may be a Transmission Control Protocol (TCP) stack. The application 105 can send and receive TCP/IP messages by opening a socket and reading and writing data to and from the socket, and the operating system 104 causes the messages to be transported across the network. For example, the application can invoke a system call (syscall) for transmission of data through the socket and then via the operating system 104 to the network 103. This interface for transmitting messages may be known as the message passing interface.

Instead of implementing the stack in the host 101, some systems offload the protocol stack to the network interface device 102. For example, in the case that the stack is a TCP stack, the network interface device 102 may comprise a TCP Offload Engine (TOE) for performing the TCP protocol processing. By performing the protocol processing in the network interface device 102 instead of in the host computing device 101, the demand on the host system's 101 processor/s may be reduced. Data to be transmitted over the network may be sent by an application 105 via a TOE-enabled virtual interface driver, by-passing the kernel TCP/IP stack entirely. Data sent along this fast path therefore need only be formatted to meet the requirements of the TOE driver.

The host computing device 101 may comprise one or more processors and one or more memories. In some embodiments, the host computing device 101 and the network interface device 102 may communicate via a bus, for example a peripheral component interconnect express (PCIe bus).

During operation of the data processing system, data to be transmitted onto the network may be transferred from the host computing device 101 to the network interface device 102 for transmission. In one example, data packets may be transferred from the host to the network interface device directly by the host processor. The host may provide data to one or more buffers 106 located on the network interface device 102. The network interface device 102 may then prepare the data packets and transmit them over the network 103.

Alternatively, the data may be written to a buffer 107 in the host system 101. The data may then be retrieved from the buffer 107 by the network interface device and transmitted over the network 103.

In both of these cases, data is temporarily stored in one or more buffers prior to transmission over the network.

Some embodiments relate to the transmission of data over a network from a data processing system. A data processing system could be any kind of computing device, such as a server, personal computer or handheld device. Some embodiments may be suitable for use in networks that operate TCP/IP over Ethernet. In other embodiments one or more different protocols may be used. Embodiments may be used with any suitable networks, wired or wireless.

Buffer 106 may be any suitable memory, a FIFO, or set of registers. The buffer may be such that any operations which require modifications to the frame (for example checksum insertion into headers) are completed before that portion of the frame is transferred to the MAC (media access control).

As mentioned, the protocol processing may be offloaded to the network interface device to be performed in the network interface. In the case that such offloading is performed at the network interface device, it may desirable to implement functionality on the network interface device that can make use of the protocol processing capabilities of the network interface device. By implementing such functionality in the network interface device instead of the host, potential improvements in latency may be achieved by reducing the data transfer between the host and the network interface device.

According to some embodiments of the application, a Field Programmable Gate Array (FPGA) application is provided on the network interface device. In some embodiments, the NIC functionality may be embedded in an FPGA. The FPGA application may be understood to be an application that is implemented using an integrated circuit designed to be configured by a customer or designer after its manufacture. FPGAs may offer the ability to deploy a circuit which provides an application specific solution. An FPGA can allow for customization of a network interface device. Such applications may be niche or small volume applications. The FPGA is an array of programmable logic blocks. An FPGA may be characterised as being reprogrammable at the logic element granularity. An FPGA may be regarded as being an array of gates.

A first interface (for example a Fabric interface) may be provided in the network interface device between the FPGA application and the host computing device, the first interface being configured to receive data from the host and pass at least some of the data to the FPGA application. The data received from the host over the first interface for delivery to the FPGA application may be any type of data transaction. For example, the data may be a data packet having a payload and header according to a suitable network protocol. The data packet may be an egress data packet for transmission over the network. On the other hand, the data may be a "read" request for access to a data structure maintained by the FPGA application. In response to such a request (which may take the form of a local instructions issued to an address memory mapped to a memory accessible to the FPGA), the FPGA application may return the requested data to the host via the first interface. The data received could, in other words, be a lookup request received from the host. In some cases, the read operation from the host may cause side effects such as an update to data maintained by the FPGA application. For example, the FPGA could comprise a store/database (of, for example, a key value). The FPGA application may receive from the host an update to the store/database from the FPGA in the form of memory "write" instructions, which may take the form of a store instruction to a mapped address. The write could update a data structure or cause any other side effect as implemented by the FPGA.

If the first interface receives data for transmission over the network, the first interface may be configured to pass some of this data to the FPGA application for processing. The first interface may pass the remaining data to a transport engine for protocol processing and transmission over the network without it being processed by the FPGA application. The FPGA application may be configured to perform the processing of data packets it receives. In some cases (e.g. the data is for transmission over a network), the FPGA application is configured to then pass the processed data to the transport engine for protocol processing to form protocol processed data packets. Hence, the processing by the FPGA application is optional from the perspective of the first interface. The first interface has the capability to apportion work to the FPGA application. Once the protocol processing has been performed, the data packets are then transmitted over the network.

A second interface may be provided in the network interface device, for interfacing the device with the network. The second interface may be a Layer2 Streaming Interface. The second interface is configured to receive data packets from the FPGA application or from the transport engine and cause them to be transmitted over the network.

The network interface device is also configured to receive ingress data packets from the network and pass them to the host or the FPGA depending on a classification of the packets, e.g. MAC or virtual local area network (VLAN).

The transport engine is configured to receive some ingress data packets from the network and perform receive protocol processing of the data packet prior to passing at least some of the data packets to the first interface. The first interface is configured to receive these protocol processed data packets from the transport engine and pass some of them to the FPGA application. The first interface may be configured to cause the remaining data packets to be transmitted to the host without being processed by the FPGA application. The FPGA application may then be configured to perform processing of the data packets passed to it prior to the data packets being transmitted to the host via the first interface. The first interface may be configured to receive data packets from the FPGA application that have been processed by the FPGA application, and to pass these processed packets to the host computing device. Alternatively, instead of transmitting the data packets to the host, the FPGA application may be configured to process the data packets by terminating them. The FPGA application may be configured to process the data packets by consuming them. The FPGA application may process the data packets by filtering them and passing only some of them to the host.

In some embodiments, the second interface may be configured to receive data packets from the network and provide them to the FPGA application prior to protocol processing at the transport engine. The FPGA application may perform the processing of the data packets and may then pass the processed data packets to the transport engine. The transport engine is configured to receive the data packets from the FPGA application, protocol process them, and then pass them to the first interface to be transmitted to the host. The transport engine may backpressure the second interface. A third interface, which may be a MAC layer, may also be provided between the second interface and the network. The third interface may receive data packets from the network and provide them to the second interface. The third interface may be back-pressured by the transport engine or by the second interface.

A third interface, which may be MAC layer, may also be provided between the second interface and the network. The third interface may receive data packets from the network and provide them to the second interface.

In some embodiments, the transport engine may receive egress data packets from the host for protocol processing prior to them being passed to the FPGA application. The FPGA application may then process the protocol processed data packets prior to passing them to the second interface for transmission over the network. The second interface may be configured to pass the data packets to the third interface, which is configured to cause them to be transmitted over the network. The second interface may be back-pressured by the third interface. The transport engine may be back pressured by the second interface or the third interface.

The FPGA application may need to compete for host memory and PCI bandwidth used to communicate with the host. The FPGA application may also need to compete for network bandwidth. The FPGA application may need to compete for these resources with, for example, data flows being sent and received between the host and the network.

The back pressuring of the transport engine or the interfaces could, for example, be used to free up additional resources for the FPGA application. For example, the transport engine may be back-pressured by the second interface. This may free up resources for the FPGA application communicate over the network, by reducing the proportion of network resources in use for transmitting data packets from the transport engine.

Different techniques may be used by the network interface device for scheduling so as to allocate the resources appropriately. In one example, credit-base flow control may be implemented. For example, the FPGA application may have data to be written to the host. The FPGA application may make the transfer of data to the host in response to determining that sufficient credits are available for the making of the transfer of the data to the host. For example, the FPGA application may receive the credits from the host and, in response, to send the data to the host. The credits may be bus credits, such as PCIe tags. The credits may be sent by the first interface to both the FPGA application and the transport engine. The credits may be shared amongst the FPGA application and the transport engine. The credits may be shared amongst the slices of the transport engine. By using this flow control method, the host may exert control over the resources used by the host.

In another example XOFF/XON flow control may be implemented. For example, the host may transmit to the network interface device XOFF/XON codes that indicate to the FPGA application whether or not data should be transmitted from the FPGA application to the host. The FPGA application may transmit data to the host in response to receiving an indication to transmit. The FPGA application may continue to transmit data to the host until an indication not to transmit is received. The FPGA application may then resume transmission until an indication to transmit is again received.

Some embodiments may have the advantage that the network interface device can be programmed to provide functions for the data packets in the receive path or on the transmit path as a customer or designer would see fit. These functions could be performed for only some or for all of the data packets on the receive path or transmit path.

As the FPGA application is provided with the first interface where the data paths also interface to the host, the FPGA application may make use of data path operations. For example the data path operation may be a checksum offload operation. The first interface may allow the network interface device to properly schedule work between host applications and the FPGA application. The FPGA application with this architecture is able to communicate with the other network interface device applications using a relative high bandwidth and/or relative low latency interconnect. Some embodiments may have the advantage that the FPGA application is integrated within the network interface functionality.

In some embodiments, a plurality of FPGA applications may be provided in the network interface device. The plurality of FPGA applications may be configured to perform different types of processing.

Some embodiments may support a significant amount of per-frame packet processing.

Figure 2:
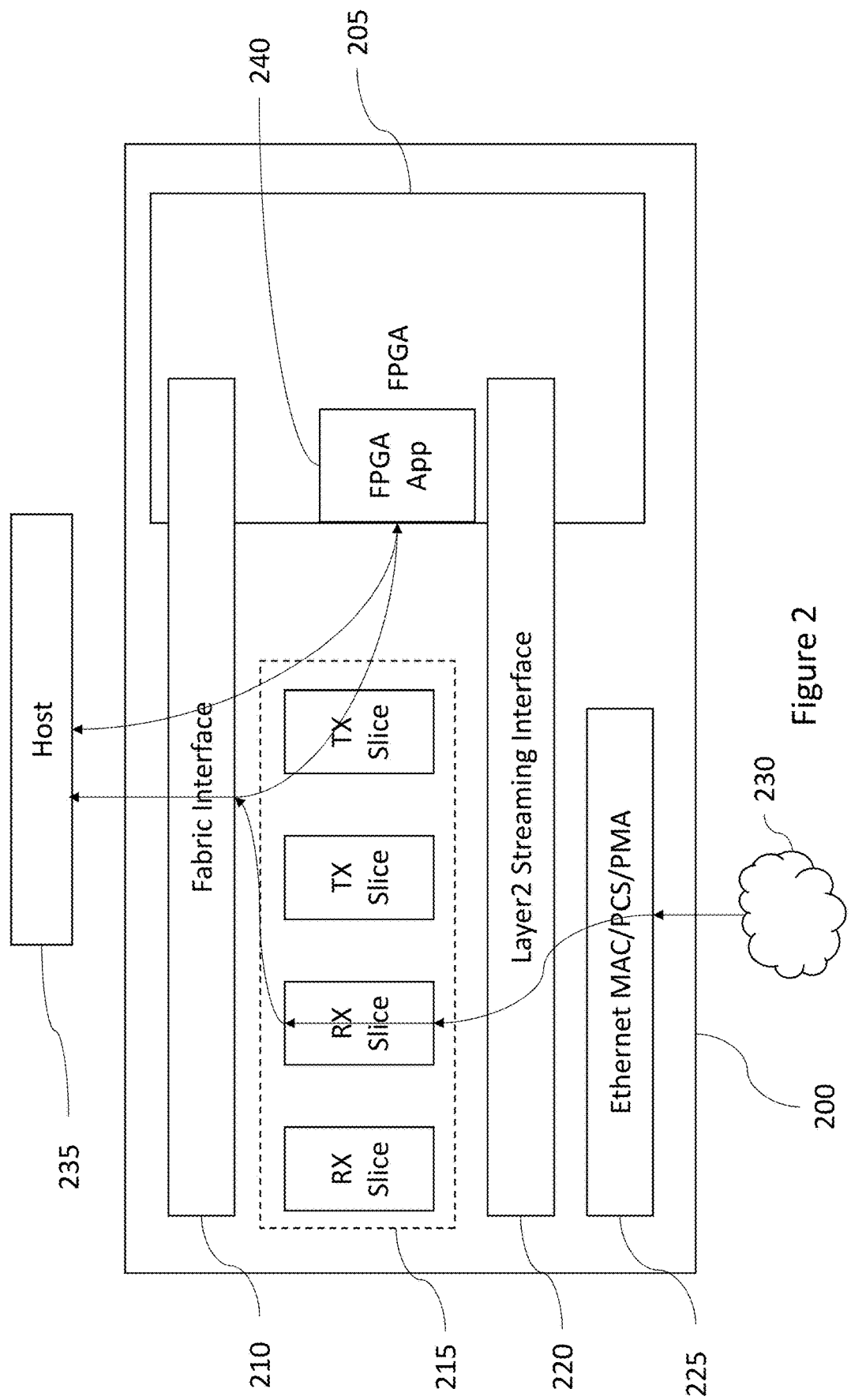
FIG. 2 shows a schematic view of a network interface device according to embodiments of the application.

Reference is made to FIG. 2, which shows a network interface device 200 according some embodiments of the application.

The network interface device functionality may be embedded in an FPGA 205 in some embodiments. That FPGA 205 may have network interface functionality and FPGA functionality. The FPGA functionality may provide an FPGA application 240, which may programmed into the FPGA 205 according to the needs of the network interface device user. The FPGA application 240 may, for example, provide filtering of the messages on the receive path from the network 230 to the host. The FPGA application 240 may provide a firewall.

The FPGA application 240 may be used for any suitable purpose. For example, the FPGA application 240 may reduce data in one or more flows. For example, the FPGA application 240 may remove duplicate messages in an arbitration application. The FPGA application 240 may alternatively or additionally be used to aggregate data. For example the FPGA may buffer and consolidate network captures for more efficient host delivery. Alternatively or additionally, the FPGA may be used for hybrid processing. For example the FPGA may provide a toolkit to enable hybrid applications to implement fast-path processing (low-latency) on the FPGA while using a slice to handle slower (and more complex TCP) protocol activity. This is also known as Delegated-Send on the transmit side. The FPGA may be used to detect frames which are part of DDOS attack. Those frames may be dropped or filtered. The FPGA may alternatively or additionally be used for machine learning with a neural network or the like.

The FPGA may be programmable to provide the FPGA application 240 using a high level programming language, such as C-based languages. The high level programming of the FPGA may be achieved using high level synthesis. The FPGA application 240 may implement a neural network and perform feature extraction or classification based on incoming frames.

In some embodiments, the network interface device functionality may be implemented as "hard" logic within the FPGA. For example, the hard logic may be Application Specific Integrated Circuit (ASIC) gates. The FPGA application 240 may be implemented as "soft" logic. The soft logic may be provided by programming the FPGA LUTs (look up tables). The hard logic may be capable of being clocked at a higher rate as compared to the soft logic.

The network interface device 200 includes a first interface 210 configured to receive data from the host 230. The first interface 210 may be a fabric interface. The first interface 210 interfaces the transport engine 215 with the host computing device 235. The first interface 210 also interfaces the FPGA application 240 with the host 235. The first interface may provide an application programming interface, allowing the host 235 to perform memory read and writes to memory associated with the FPGA application 240.

Some drivers may be associated with the memory interfaces. This allows host applications to directly access the FPGA application 240 from the host and make uses of the functions of the FPGA application 240 at the same time that the FPGA is used as a network interface device. The memory based interface may be mapped through a different PCI function than is used by the message passing interfaces. The message passing interfaces typically have one function per Ethernet port. The host software may attach a driver to each function and may attach the network stack to the interface to the network.

The network interface device 200 further comprises a transport engine 215, configured to process the data packets in accordance with a transport protocol, such as TCP/IP. The transport engine 215 may comprise a protocol stack. The transport engine 215 may comprise a plurality of slices or data pipeline, some of the slices being RX slices configured to perform receive processing of the ingress data packets received from the network 230, and some of the slices being TX slices configured to perform transmit processing of the egress data packets to be transmitted onto the network 230. In some embodiments, a slice may be able to handle both data to be transmitted and received data.

In the example shown, four slices are provided. However, it should be appreciated that in other embodiments, a different number of slices are used. In one embodiment, a slice may be arranged to process received data or to process data to be transmitted. In other embodiments, a slice may be arranged such that it is able to process received data and data to be transmitted. In some embodiments, the number of slices may be the same as the number of ports. In some embodiments, there may be a transmit slice and a receive slice for each port. In some embodiments, there may not be a direct correlation between the number of ports and the number of slices. In some embodiments, a slice can be switched dynamically from processing received data to processing transmitted data and vice versa.

Each slice may be regarded as a processing engine. Each slice may thus execute micro code to implement functions such as parsing, matching offload and delivery semantics for the data path. The slice may act on any bit of a frame.

The slices may perform a parsing action on the data which the slice is processing. There may be a matching action which matches the data against for example a filter and action function which performs an action or not in dependence on the result of the matching.

The network interface device 200 also comprises a second interface 220 configured to interface the transport engine 215 with the network 230 and configured to interface the FPGA application 240 with the network 230. The second interface maybe a layer 2 streaming interface. The second interface may provide an interface to the network 230 via a third interface 225. The third interface 225 may receive data packets from the second interface and cause them to be transmitted over the network 230. The third interface 225 may similarly receive data packets from the network 230 and pass them to the second interface 220. The third interface 225 may comprise a MAC interface. The third interface 225 may comprise a plurality of MAC interfaces. The third interface 225 may comprise one or more Physical Coding Sublayer (PCS) interfaces. The third interface 225 may comprise one or more Physical Medium Attachment (PMA) interfaces.

The fabric interface is configured to allow the co-resident FPGA application 240 to receive frames from the host. The FPGA application 240 may be able to transmit frames to the work with data path processing at the same bandwidth as the host PCI.

The layer 2 streaming interface is configure to allow the FPGA application 240 to receive frames form any active MAC layer interface and to transmit frames to a data path associated with that MAC.

The network interface device may provide functionality such as flow steering and low latency operation, hardware timestamping and clock synchronization.

FIG. 2 shows a path that may be taken by ingress data packets upon their reception from the network 230. The third interface 225 is configured to receive the data packets from the network and pass them to the second interface 220. The second interface 220 is configured to pass the data packets to the transport engine 215, which performs processing of the data packets, prior to passing the processed data packets to the fabric interface 210. The fabric interface 210 is configured to pass some of the data packets to the host 235, and some of the data packets to the FPGA application 240. The fabric interface may determine to pass data packets of a first flow to the host 235 and data packets of a second flow to the FPGA 205. The data packets received at the FPGA application 240 are processed by the FPGA application 240, before being passed to the host 235. Hence, the FPGA 205 can provide accelerator functions for some data packets prior to them being received at the host 235.

As explained, the FPGA 205 may provide a plurality of FPGA applications. The FPGA 205 could provide a first application and a second application. In FIG. 2, it is shown that data may be directed from a first interface 210 to the first field programmable gate array application 240 for processing. Additionally, however, the first and second interface may be configured to direct data to a second field programmable gate array for processing.

Figure 7:
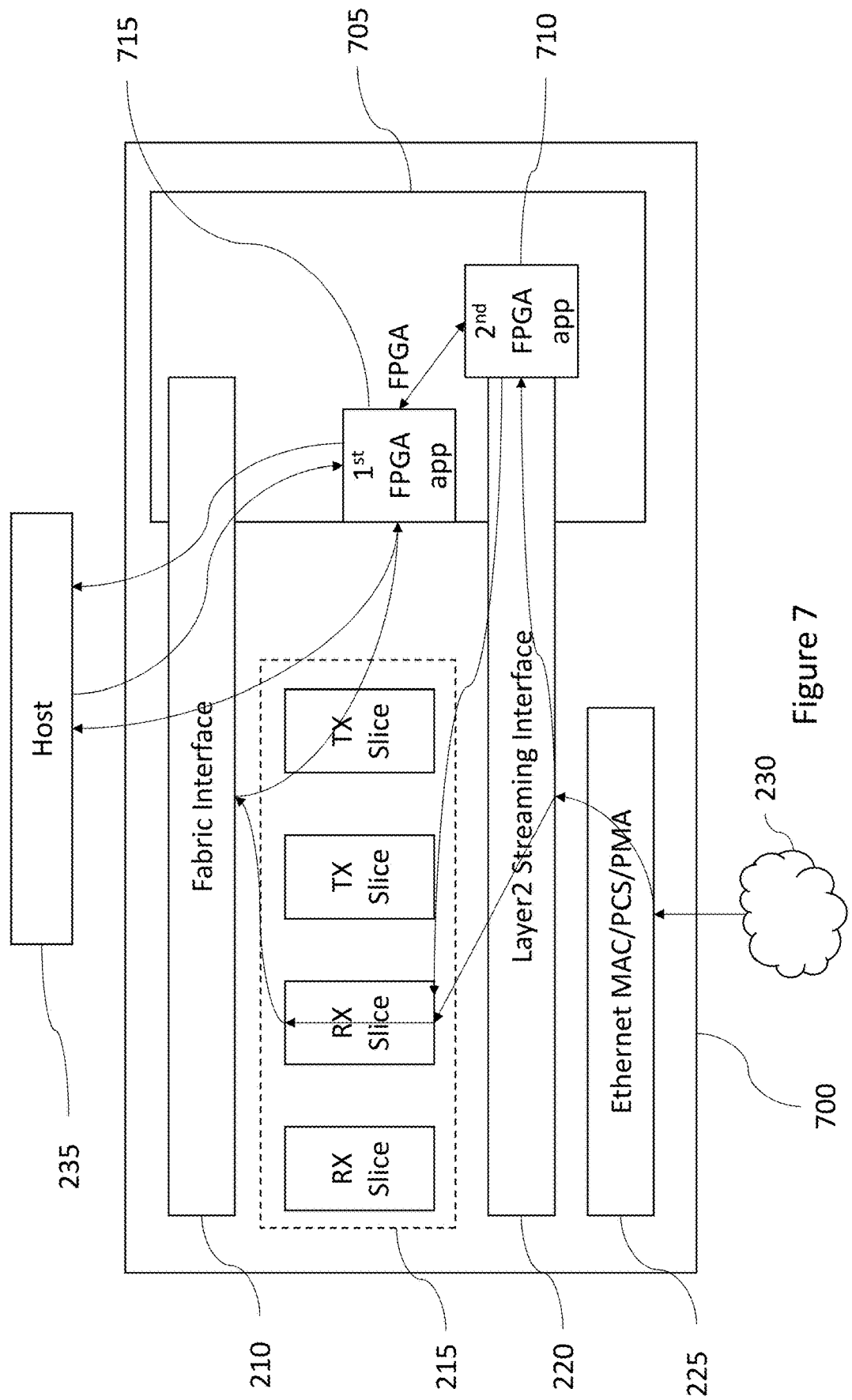
FIG. 7 shows a schematic view of a network interface device according to embodiments of the application.

Reference is made to FIG. 7, which shows an example of a network interface device 700 according to embodiments of the application. In this case, the FPGA 705 provides a first FPGA application 715 and a second FPGA application 710. The second interface 220 is configured to receive the data packets from the network and provide the data packets to the second FPGA application 710 for processing. The second FPGA application 710 may process the data by performing DDOS mitigation, such as searching the data packets for a DDOS attack and taking remedial action against a DDOS attack. The data packets may comprise updates to a data store, maintained by the first FPGA application 715. The second FPGA application 710 is configured to provide security by searching the data packets to detect any threats posed by the data packets and taking any action as required.

After processing by the second FPGA application 710, the second FPGA application 710 is configured to provide the data packets to the transport engine 215 for protocol processing. Once the data packets have been processed, they are passed to a first interface, which is configured to provide the data packets to the first FPGA application 715. The first FPGA application 715 is configured to process the data packets. The processing by the first FPGA application 715 may comprise updating the data store maintained by the first FPGA application 715 with the data contained in the data packets.

The host may also provide queries of the data in the data store maintained by the first FPGA application 715. In response to a query, the first FPGA application 715 may be configured to provide the requested data from the data store to the host 235.

Additionally, although not shown in FIG. 7, the first FPGA application 715 may communicate with the second interface 220 to send and receive data with the transport engine 215 and the network 230. The first FPGA application 715 may send data to the transport engine 215 on the receive path or the transmit path. The first FPGA application 715 may receive data from the transport engine 215 on the receive path or the transmit path. Additionally, although not shown in FIG. 7, the second FPGA application 710 may communicate with the first interface 210 to send and receive data with the transport engine 215 and the host 235. The second FPGA application 710 may send data to the transport engine 215 on the receive path or the transmit path. The second FPGA application 710 may receive data from the transport engine 215 on the receive path or the transmit path.

The first FPGA application 715 and the second FPGA application 710 may both have access to shared state, which they may use for communicating with each other.

Figure 3:
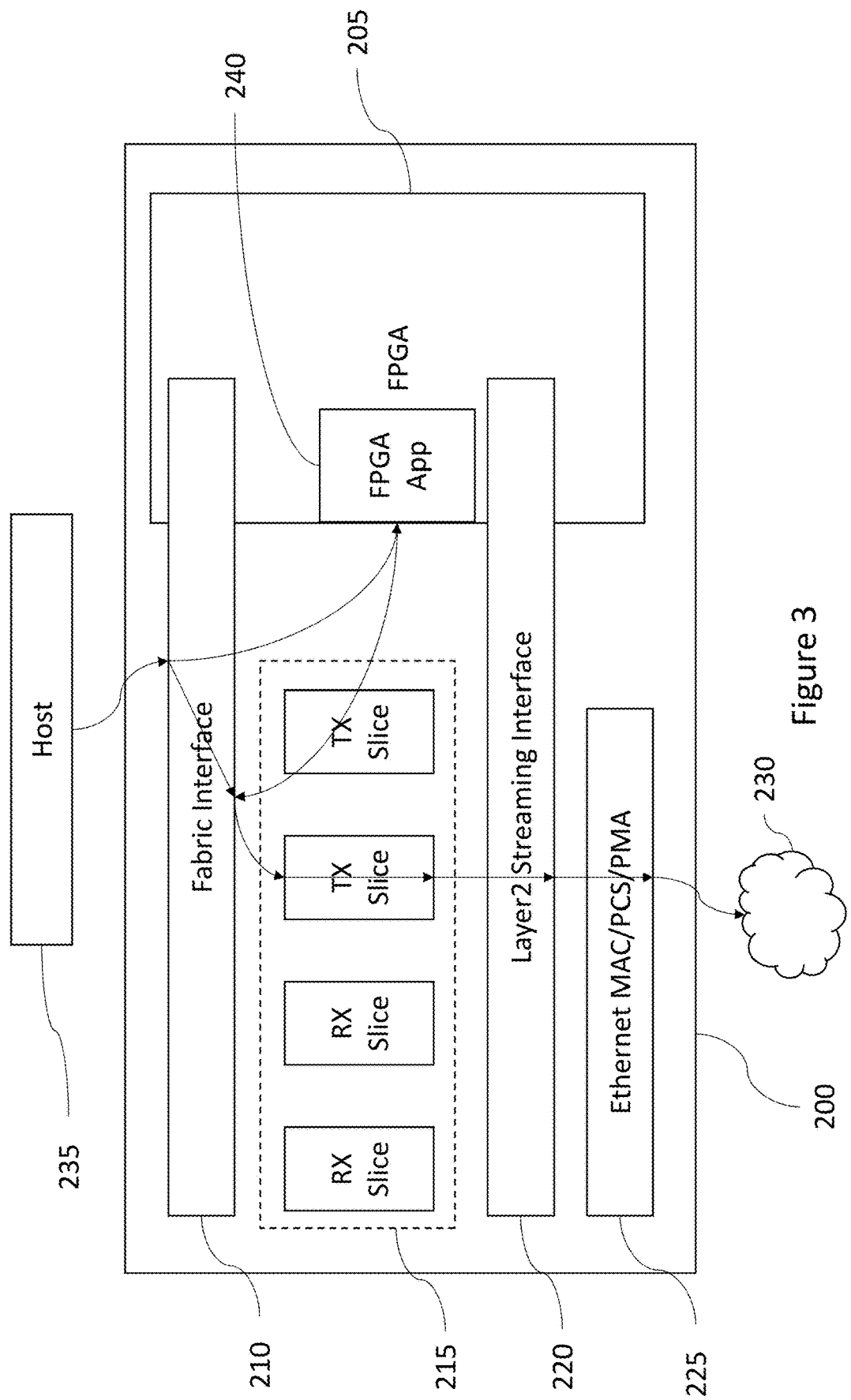
FIG. 3 shows a schematic view of a network interface device according to embodiments of the application.

Reference is made to FIG. 3, which shows the same network interface device 200 shown in FIG. 2, but, in this case, indicates a path that may be taken by data received from the host 235. The first interface 210 is configured to receive data from the host 235 and to direct some of the data to the transport engine 215 for processing without it first being processed by the FPGA application 240. The first interface 210 is also configured to transfer some data to the FPGA application 240 for processing by the FPGA application 240. Once the data have been processed by the FPGA application 240, the FPGA application 240 may be configured to transfer those data packets to the first interface, which is configured to pass them to the transport engine 215 for protocol processing. The transport engine 215 is configured to process the data it receives to produce protocol processed data packets prior to them being transmitted onto the network. The protocol processed data packets may be passed to the second interface 220 and subsequently the third interface 225 prior to their transmission onto the network 230.

As will be explained with reference to FIG. 6 below, a host application may communicate directly with the FPGA application 240 via memory mapping. The host application may write to a shared memory on the host 235, which is memory mapped to a memory accessible to the FPGA application 240. Hence, the FPGA application 240 may receive data written to the shared memory by the host 235. Likewise, the FPGA application 240 may write to the memory that is accessible to it, with that data being automatically copied from that memory to the memory of the host 235 so that it received by the host application 235.

In some cases, some data may be transferred to the transport engine 215 from the host 235 and some data may be transferred to the FPGA application 240 from the host 235 in parallel. For example, a first host application may transfer data to the transport engine 215 via the first interface, whilst a second host application is transferring data to the FPGA application 240 at the same time.

Figure 4:
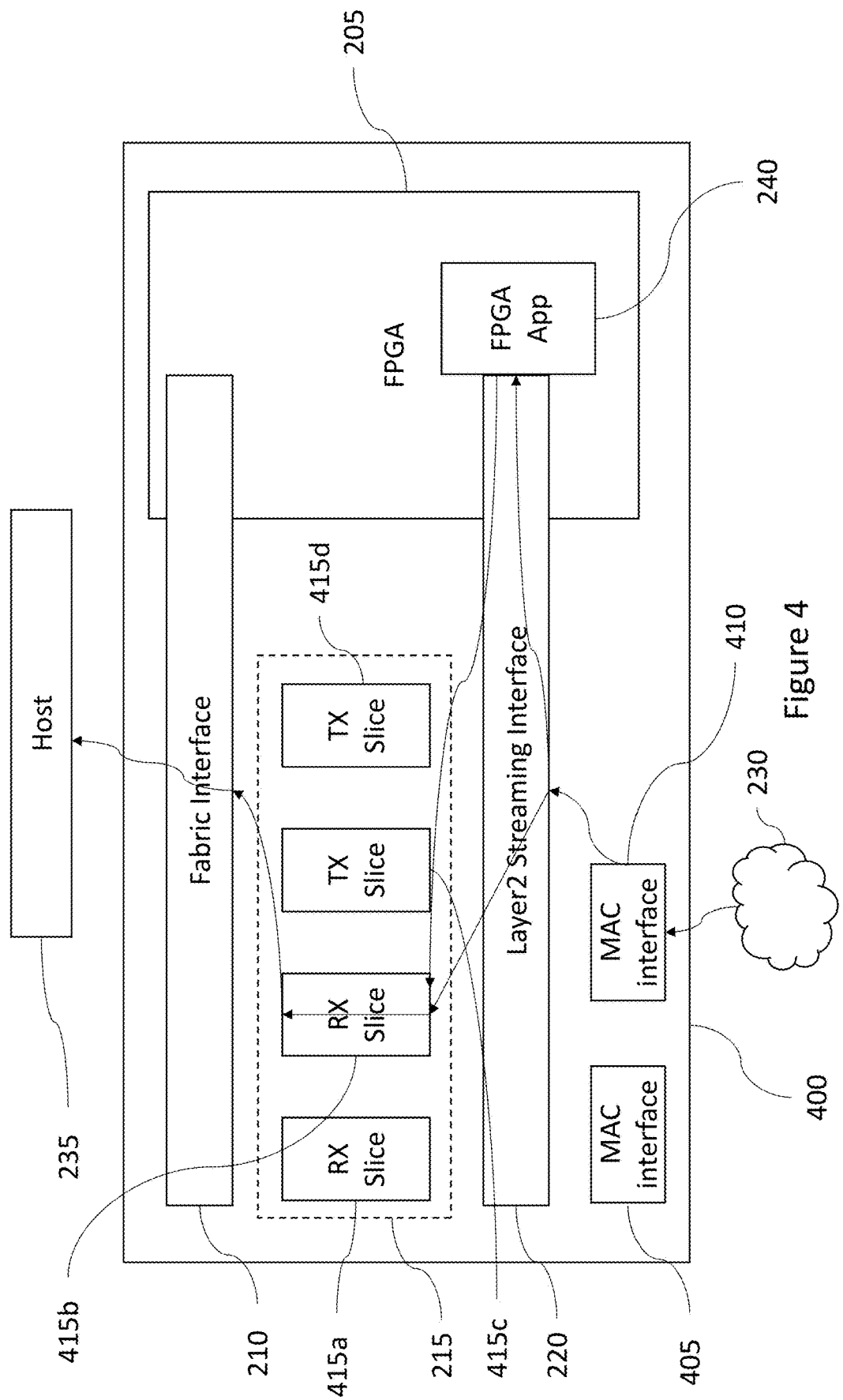
FIG. 4 shows a schematic view of a network interface device according to embodiments of the application.

Reference is made to FIG. 4, which shows a network interface device 400 according to some embodiments of the application. The network interface device 400 is similar to the network interface device 200 shown in FIGS. 2 and 3, with like elements being indicated with like reference numerals. However, FIG. 4 shows the network interface device 400 having two separate MAC interfaces 405, 410. In this case, the two MAC interfaces 405, 410 may be understood to constitute the third interface. Each MAC interface may be associated with different slices of the transport engine. For example, the first MAC interface 405 may be associated with a first receive slice 415*a*, such that data packets, which are received at the first MAC interface 405 are delivered by the second interface 220 to the first receive slice 415*a* for receive processing. The first MAC interface 405 may also be associated with a first transmit slice 415*c*, such that data packets for which transmit processing is carried out at the transmit slice 415*c* are delivered by the second interface 220 to the MAC interface 405 for transmission over the network. The second MAC interface 410 may be associated with a second receive slice 415*b*, such that data packets, which are received at the second MAC interface 410 are delivered by the second interface 220 to the second receive slice 415*c* for receive processing. The second MAC interface 410 may also be associated with a second transmit slice 415*d*, such that data packets for which transmit processing is carried out at the transmit slice 415*d* are delivered by the second interface 220 to the second MAC interface 410 for transmission over the network.

FIG. 4 shows a path that may be taken by data packets upon reception from the network 230. The data packets may be received at the third interface (e.g. the second MAC interface 410) and be passed to the second interface 220. The second interface 200 may be configured to transfer some data packets to the transport engine 215 and other data packets to the FPGA application 240. The FPGA application 240 is configured to process the data packets and pass them (e.g. via the second interface) to the transport engine 215. The transport engine 415 is configured to process the data packets prior to passing them to the host via the first interface 210.

The transport engine 215 may be configured to back-pressure the second interface. The transport engine 215 comprises one or more buffers for storing data on which receive protocol processing is to be performed. If a large amount of traffic is received from the network 230, there is a risk of buffer overflow for the one or more buffers stored by the transport engine 215. Therefore, in this case, the transport engine 215 may provide an indication to the second interface 220 to reduce the rate of data transfer to the transport engine 215. The transport engine 215 may be configured to monitor buffer utilization of the one or more buffers, and if the buffer utilization gets too high to provide an indication of such to the second interface 220, which reduces the rate at which is provides data packets to the transport engine 215 for processing. Similarly, the second interface 220 may back-pressure the third interface, by providing the indication that the buffer utilization is too high to the third interface. The third interface being then configured to reduce the rate at which it transfers data packets to the second interface 220. The back pressuring of the third interface may be specific to the MAC interface associated with the particular slice, which is configured to perform receive processing for that MAC interface. For example, if the second receive slice 415b determines that the buffer utilization of a buffer associated with this slice gets too high, an indication of such may be provided to the second MAC interface 410, which reduces the rate of transfer to the second receive slice 415b.

Figure 5:
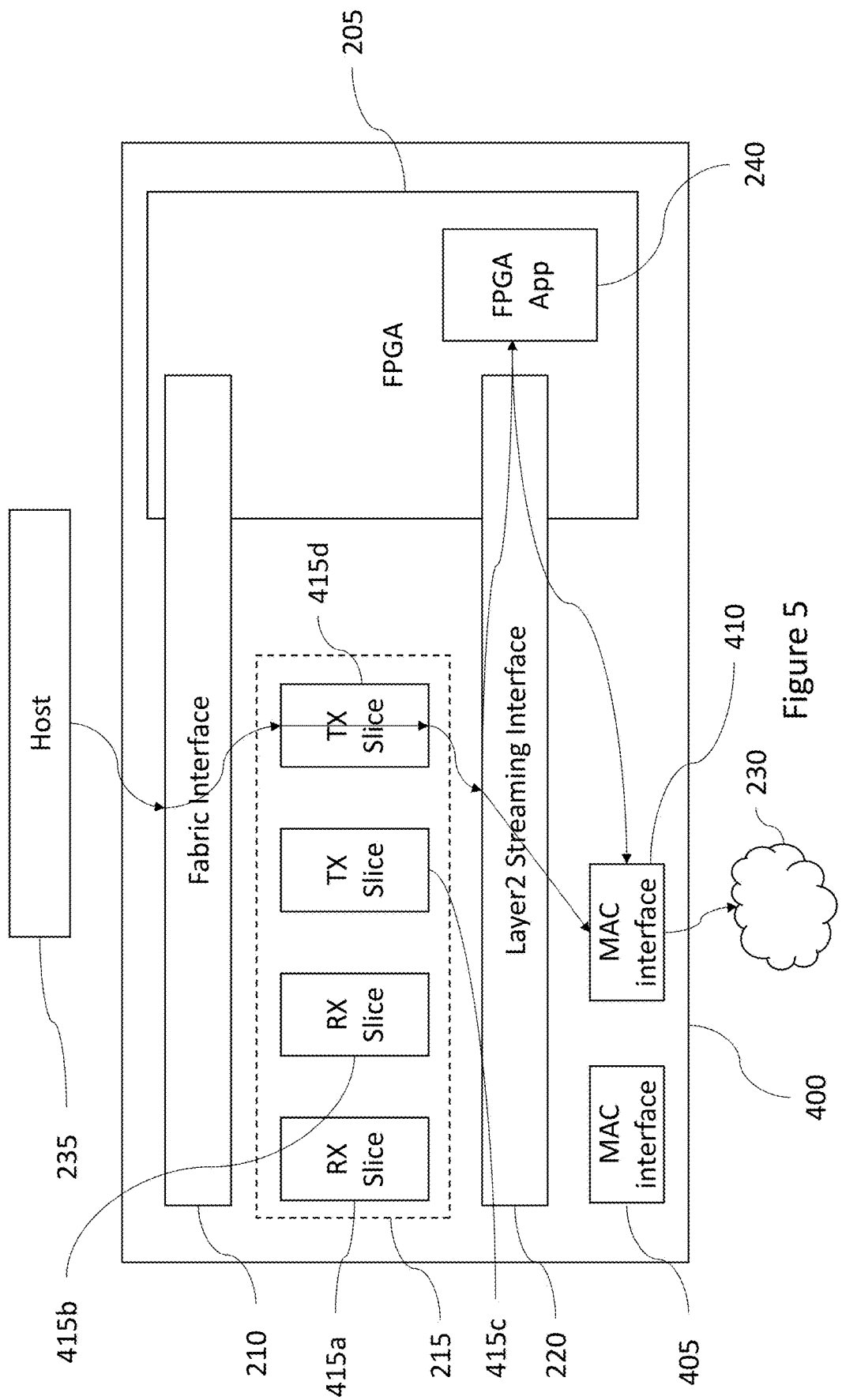
FIG. 5 shows a schematic view of a network interface device according to embodiments of the application.

Reference is made to FIG. 5, which shows the same network interface device 400 shown in FIG. 4, but, in this case, indicates a path that may be taken by egress data packets received from the host 235 for transmission onto the network 230. The data packets are received from the host 235 and transferred via the first interface 210 to the transport engine 215, which performs processing of the data packets and passes the data packets to the second interface 220. The second interface 220 is configured to pass some of the data packets to the third interface for transmission onto the network 230, without being processed by the FPGA application 240. The second interface 220 is configured to pass some of the data packets to the FPGA application 240. The FPGA application 240 processes the data packets and then passes them to the third interface 410 for transmission over the network.

In this case, the second interface 220 may back-pressure the third interface. The second interface 220 comprises one or more buffers for storing data on which receive protocol processing is to be performed. If a large amount of traffic is received at the second interface 220 for delivery to the network 230, there is a risk of buffer overflow for the one or more buffers stored by the second interface 220. Therefore, in this case, the second interface 220 may provide an indication to the transport engine to reduce the rate of data transfer to the second interface 220. The second interface 220 may be configured to monitor buffer utilization of the one or more buffers, and if the buffer utilization gets too high to provide an indication of such to the second interface 220, which reduces the rate at which is provides data packets to the third interface. Similarly, the third interface may back-pressure the second interface 220, by providing an indication that the buffer utilization of the third interface is too high, the second interface 220 being then configured to reduce the rate at which it transfers data packets to the third interface.

The concepts explained with regard to FIGS. 2, 3, 4, 5, and 7 are not limited to those specific embodiments and may be combined.

Figure 6:
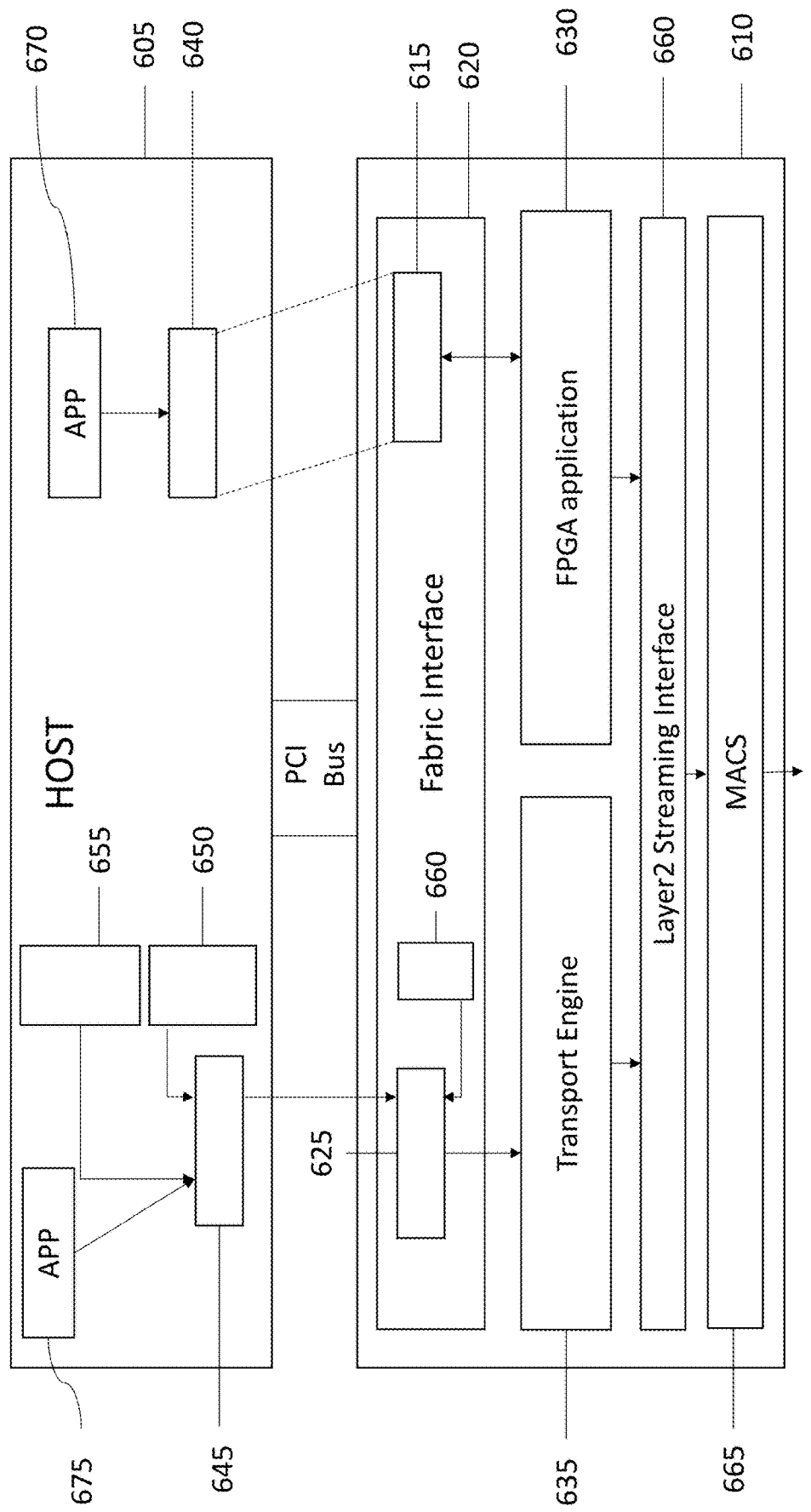
FIG. 6 shows a data processing system according to embodiments of the application.

Reference is made to FIG. 6, which illustrates how data may be transferred from the host 605 to the network interface device 610. As explained previously, the first interface 620 is configured to receive data from the host 605. The host 605 may make the determination as to which of these is to apply to particular data. The host 605 may transfer data using different methods to memory associated with the first interface 620. For example, the host 605 may memory map data to a first memory 615 of the first interface 620. The first interface 620 is configured to provide the data in the first memory 615 to the FPGA application 630. Alternatively, the host 605 may transfer data to a second memory 625 of the first interface 620. The first interface 620 then being configured to provide the data in the second memory 625 to the transport engine 635 for processing. The first memory 615 and the second memory 625 may each comprise one or more buffers.

The host comprise a memory 640, which is memory mapped to the memory 615 on the network interface device 610. The memory mapping may be such that a user level process/host application 670, which is configured to write to the memory 640, and the network interface device 610 both have access to shared memory to which data is written. When a user level process 670 running on the host transfers data to the memory 640, the data may be automatically transferred from the memory 640 to the memory 615.

The communication between the FPGA application 630 and the memory 640 of the host is bidirectional, i.e. the FPGA application can also transfer data to the host 605 as well as receive data from the host 605. To transfer data to the host 605, the FPGA application 630 is configured to write data to memory 615, the data being automatically transferred to memory 640, so that a user level process 670 running on the host may access the data from the memory 640.

The host 605 comprises a memory 645 at which data may be stored for transfer to the memory 625 of the network interface device 610. The data may be provided to the memory 625 from a second application 675 running on the host 605. Hence, the second application 675 may transfer data using this socket interface to the network interface device 610. The data in memory 625 is provided to the transport engine. The host 605 also comprises a transmit queue 650 comprising a series of pointers pointing to locations in the memory 645 from which data is to be transferred to the network interface device 610. The host may comprise a queue 655 identifying the next available location in the memory at which data is to be written by the application 675. The queues 650 and 655 may comprise FIFO buffers. The data may be stored in the buffer 645 at the next available location—as identified by the next pointer in the queue 655—by a user level process 675. A processor of the host device is configured to read the next pointer from the transmit queue 650 and read the data from the buffer 645 at the location identified by the pointer and transfer the data to the network interface device 610. The network interface device 610 is configured to store the data in memory 625 at a location identified by the next pointer in the receive queue 660. The data in memory 625 may then be provided to the transport engine 635 for protocol processing.

The communication between the transport engine 635 and the host 605 is also bidirectional. A similar memory transfer mechanism may be implemented for transfer of the data from the fabric interface to the host 605.

FIG. 6 also shows the second interface 660 and the third interface 665, for the sending and receiving of data from the network. Data may be transferred from the FPGA application 630 or the transport engine 635 to the second interface 660, which is configured to pass the data to the third interface 665. The third interface 665 is configured to cause the data to be transmitted over the network. On the receive path, the data may be received from the network at the third interface 665, and passed to the second interface 660. The second interface may transfer the data to the FPGA application 630 or to the transport engine 635.

The two data transfer methods shown in FIG. 6 may occur in parallel. For example, the interface used by the application 675 to transfer data to the transport engine 635 may be active at the same time as the interface used by the application 670 to transfer data to the FPGA application 630. Furthermore, these interfaces may be both in use by multiple applications in parallel. A plurality of host applications may be configured to write to memory 645 to transfer data to the transport engine 635 and a plurality of host applications may be configured to write to memory 640 to transfer data to the FPGA application 630. In some examples, both of the interfaces may have associated with it a driver and a software stack.

In some cases an application may be provided in the host that may be used to transfer state between the host 605 and the FPGA application. The application may be an Open Computing Language application. A shared memory (e.g. a memory aperture) may be mapped onto the application. The shared memory may be used to transfer state between parts of the application running on the host and parts on the FPGA. Hence, transfer of state between the host and the parts on the FPGA may be achieved.

Figure 8:
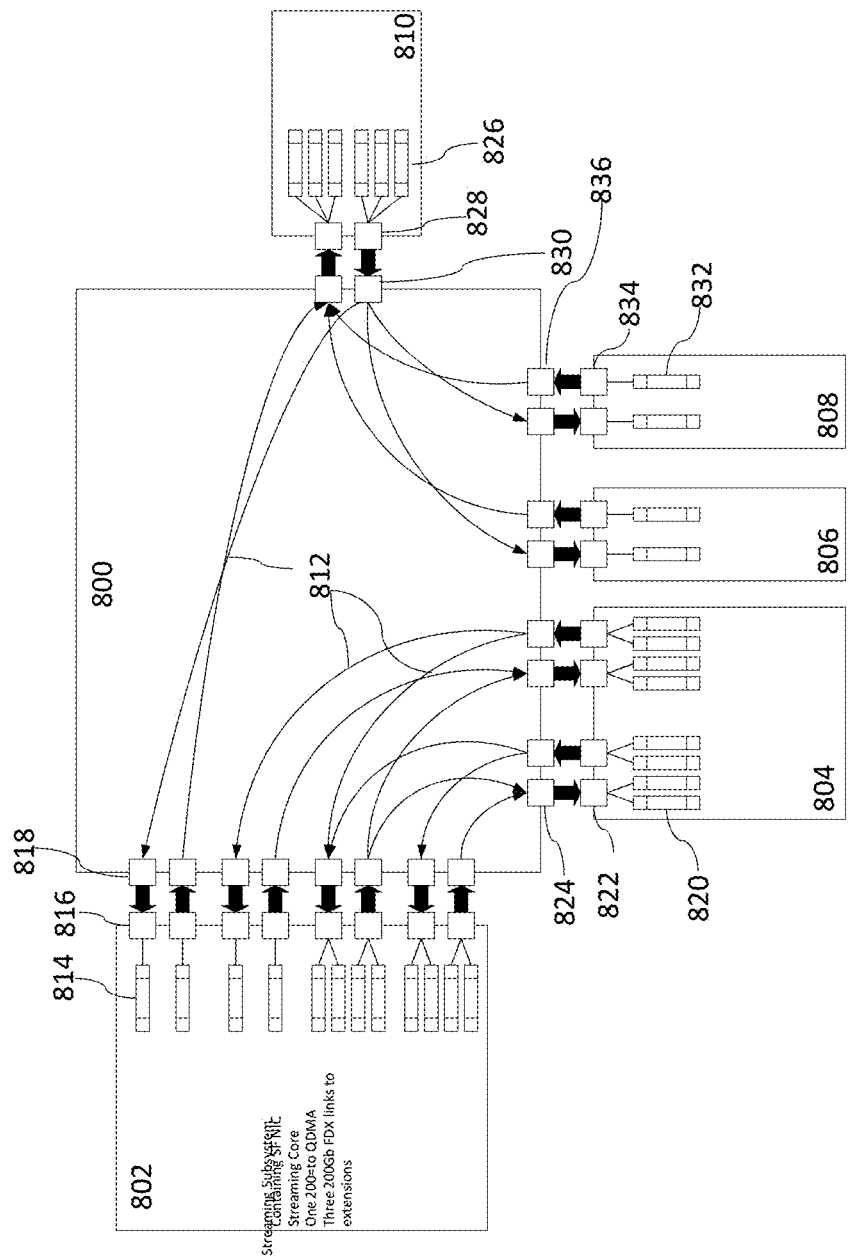
FIG. 8 shows a schematic view of part of a network interface device according to some embodiments.
Figure 9:
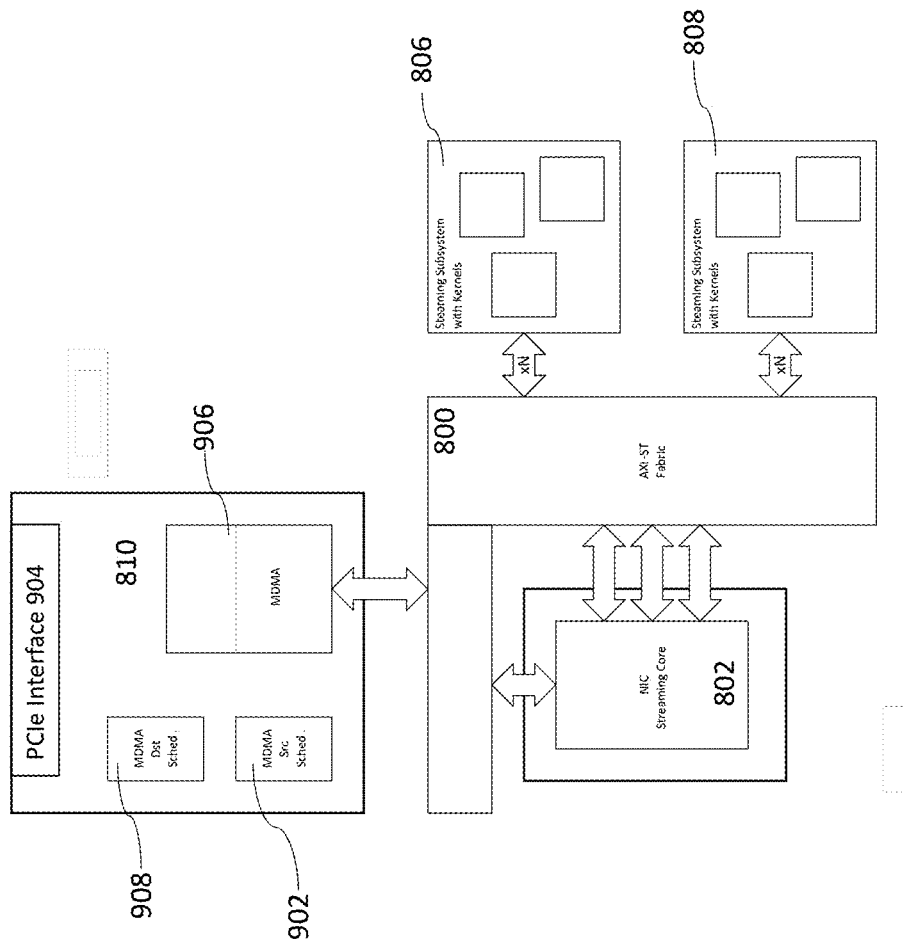
FIG. 9 shows part of the arrangement of FIG. 8 with some parts shown in more detail.
Figure 10:
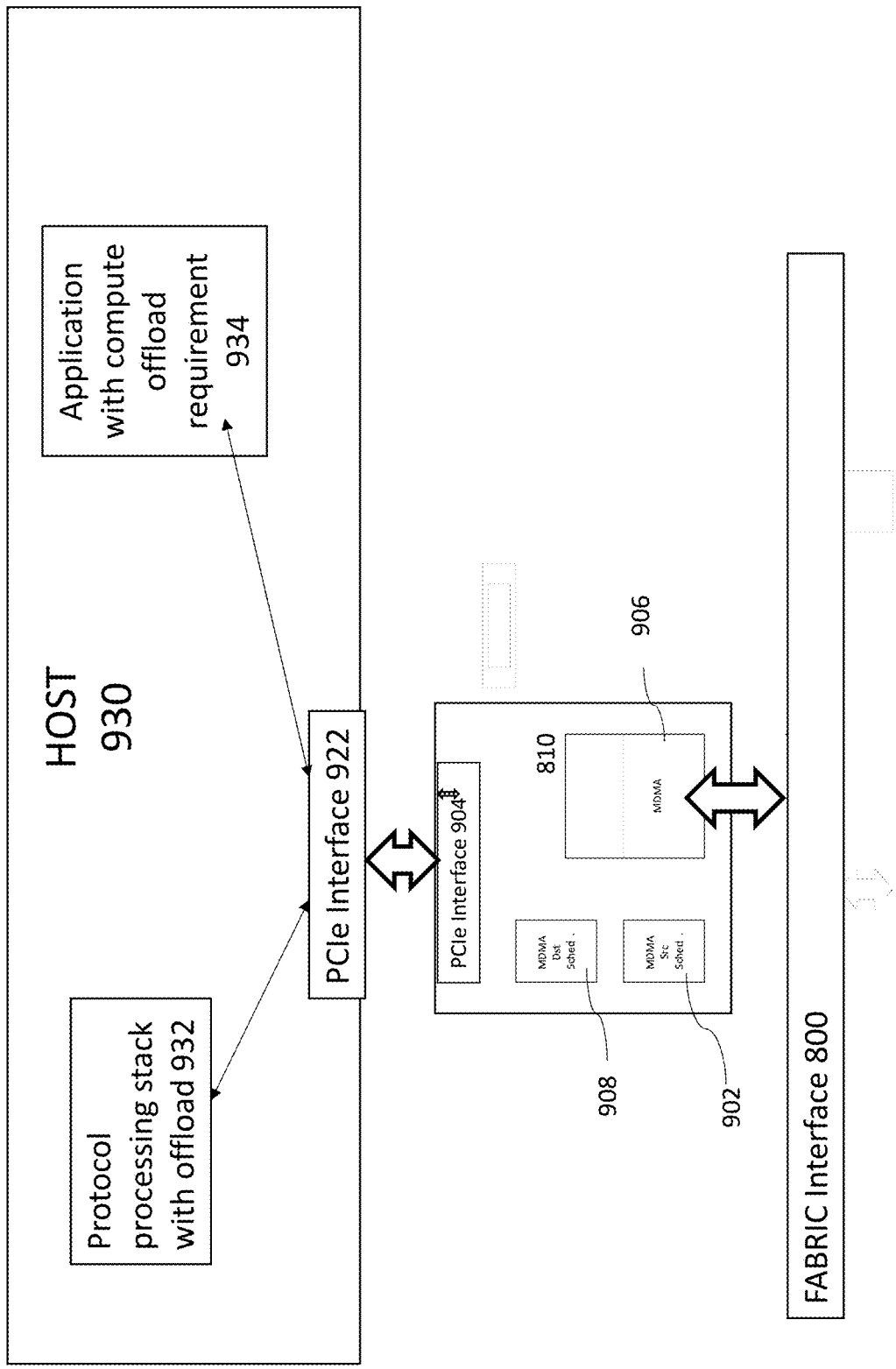
FIG. 10 shows part of the arrangement of FIG. 8 and a part of a host device.

Reference is made to FIGS. 8, 9 and 10 which shows an interface arrangement. This embodiment may be used in conjunction with or separately from the embodiments previously described. The arrangement of FIG. 8 is provided by an FPGA or similar device. In some embodiments, a part of the arrangement of the FIG. 8 may be implemented by an ASIC or the like. In this scenario, the other parts may be provided by an FPGA. This is will be described in more detail with reference to FIG. 9.

Reference is first made to FIG. 8. In this arrangement, there is an interface 800. This interface 800 may be a fabric interface such as previously described. In some embodiments, the interface may be an interface which operates in accordance with the AXI (advanced eXtensible interface) protocol. In some embodiments, the interface may be one which operates in accordance with the AXI-ST (AXI-streaming) protocol. However, it should be appreciated that the Interface can operate in accordance with any other suitable protocol in other embodiments.

The interface 800 may be regarded as providing a cross bar switch function.

A streaming subsystem comprising the network interface device streaming core 802 is provided with a plurality of input ports and a corresponding plurality of output ports. These ports are referenced 816. In other embodiments, there may be more input ports than output ports or vice versa.

In the example shown in FIG. 8, the network interface device streaming core 802 has four input ports and four output ports. In the example shown in FIG. 8, two input ports and two output ports are each associated with a single respective buffer 814. Thus there is a one to one relationship between a port and a buffer. Two of the input ports and two of the output ports are each associated with buffers. Thus there is a one to two relationship between a port and two buffers. It should be appreciated that this is by way of example only.

In some embodiments, all of the ports may be associated with the same number of buffers. In other embodiments, such as shown in FIG. 8, there may be a different number of buffers associated with a port.

In some embodiments, more than two buffers may be associated with a given port.

The ports of the network interface device streaming core 802 are configured to communicate with respective ports 818 of the interface 800.

A MDMA (multi-queue direct memory access) streaming subsystem 810 is provided. This is configured to provide an interface to the host. In this example, the MDMA streaming subsystem 810 is provided with an input port and an output port 828. In other embodiments the MDMA streaming subsystem may be provided with more than two ports. These ports of the MDMA streaming subsystem connect to respective ports 830 of the interface 800. In this example, each port is associated with three buffers 826. This is by way of example only and in other embodiments, a port of the stream may be associated with more or less than three buffers.

The streaming subsystem 810 includes its own local scheduler to manage DMA queues. This however will be described in more detail later.

One or more streaming subsystems with computer kernels 806 and 808 are also provided. In the example shown in FIG. 8, there are two such streaming subsystems with compute kernels 806 and 88. It should be appreciated that there may be more or less than two such streaming subsystems. In some embodiments, the number of such streaming subsystems may change during operation. This may be dependent on requirements of the host system. A streaming subsystem with computer kernels may be added to and/or removed from a data path.

In this example, each of the streaming subsystems with compute kernels 806 and 808 is provided with an input port and output port which are referenced 834. These respective ports are configured to communicate with respective ports 836 provided on the interface. Each of these ports is shown with a single buffer 832. However, this is by way of example only and in other embodiments more than one buffer may be associated with a given port.

In some embodiments, there may be a single streaming subsystem with compute kernels which is capable of supporting a plurality of functions. In such an embodiment, the streaming subsystem with compute kernels may be provided with more than two ports.

It should be appreciated that the streaming subsystem with compute kernels 806 and 808 are configured only to communicate with the MDMA streaming subsystem 810 in some embodiments. By configuring the communication path in the way, the host is able to configure functions which are to be performed on the network interface device without having to compete for access to resource which is used for communications between the network interface streaming core and the stream subsystem with network interface device extensions kernels.

A streaming subsystem with network interface device extension kernels 804 is provided in some embodiments. In this example, the streaming subsystem with network interface device extension kernels 804 is provided with two input ports and two output ports. The ports are referenced 822. These ports 822 are connected to respective ports 824 of the interface 800. In other embodiments, there may be more than two or less than two input ports and/or output ports.

In this example, each port is associated with three buffers 820. However, this is by way of example only and in some embodiments, each port may be associated with less than three buffers or more than three buffers.

The number of ports of the network interface device streaming core 802 which are active may be dependent on the number of functions being performed by this core and may dynamically change. In other embodiments, there may be more than one network interface device streaming core which may be added to and/or removed from a data path. Where there is the possibility of more than one network interface device streaming core, each network interface device streaming core may be associated with a fewer number of ports. For example, a pair of ports may be provided with each network interface device streaming core. In other embodiments, where there is the possibility of more than one network interface device streaming core, different instances may be provided with differing numbers of ports.

In some embodiments, data from one or more of the ports of the streaming subsystem containing the network interface device core may be received via the interface 800 at the one or more ports of the streaming subsystem with network interface device extension cores. In some embodiments, data is received at one or more of the ports of the streaming subsystem containing the network interface device core via the interface 800 from one or more port of the streaming subsystem with network interface device extension cores.

It should be appreciated that the streaming subsystem with network interface device extension kernels is, in some embodiments, configured to only communicate with the with respective ports of the streaming subsystem containing the network interface device streaming core.

In some embodiments, the number of such streaming subsystems with network interface device extension kernel functions may change during operation. This may be dependent on requirements of the host system. A streaming subsystem with network interface device extension kernel functions may be added to and/or removed from a data path.

In some embodiments, data from one or more of the ports of the streaming subsystem containing the network interface device core may be received via the interface 800 at the one or more ports of the MDMA streaming subsystem 810. In some embodiments, data is received at one or more of the ports of the streaming subsystem containing the network interface device core via the interface 800 from one or more port of the MDMA streaming subsystem.

One or more the buffers previously discussed may be provided by a FIFO (first in first out) buffer.

Separate buffers may be provided for the receive data and for the transmit data. For each data flow there may be one or more pairs of transmit and receive buffers.

The size of the buffers may be sized in dependence on the size of the maximum transmit unit MTU.

One or more of the links between two ports may be provided a link operating in accordance with the AXI-ST protocol or any other suitable protocol. In some embodiments, all of the links to the external ports of the interface 800 operate using the same protocol.

The links to the external ports of the interface may support data rates of 200 Gb in some embodiments. In other embodiments, data rates of more of less than this value may be supported.

In the embodiment shown in FIG. 8, the interface 800 may be a 9 input port by 9 output port device. In other embodiments, the interface may have any other suitable size. In some embodiments, the fabric or interface may be made up from two or more independent sub-fabrics. In the case of a 9×9 port fabric, this may be made up of a 3×3 and 5×5 fabric In some embodiments the interface 800 may have a port to the MDMA streaming subsystem which has a simple single cycle round robin arbiter.

One or more of the streaming subsystem with network interface device with extension kernel and the streaming subsystem may be implemented by a transmit and/or receive slice such as previously described.

One or more of the streaming subsystem with network interface device with extension kernel and the streaming subsystem may be implemented by an FPGA application such as previously described.

Reference is made to FIG. 9 which shows the arrangement of FIG. 8 but with the components of the MDMA streaming subsystem shown in more detail. The MDMA streaming subsystem comprises MDMA function 906 which is configured to receive data from and transmit data to the interface 800. The QDMA function may provide functions such as receive side processing and/or the like and/or may provide a queue function. Data which is to be output to the interface 100 may be received from the MDMA function 906 which may be provided with data received from a host via a PCIe or the like interface 904. Data which is received from the interface 800 is provided to the MDMA function which may provide the data to the host via the PCI or the like interface.

A MDMA source scheduler 902 is provided to schedule or arbitrate the data which is to be output to the interface. A MDMA destination scheduler 908 is provided to schedule or arbitrate the data which is to be received from the interface. The MDMA function may comprise a PCI or the like core.

In some embodiments, the functions of the network interface device streaming core and/or the MDMA streaming function may be provided by an ASIC (application specific integrated circuit) or similar arrangement. AXI ST fabric features may be used in some embodiments to support arbitration/scheduling. In some embodiments, a channel select field may be provided via dedicated lines. This may be used on the link between a cycle-arbiter and destination.

Some embodiments may use a credit packet passing from a destination to a source to control scheduling. Some embodiments may use a credit packet passing from the source to the destination. The credit packets may run on the same busses as data packets in some embodiments Some embodiments may use a packet header which may comprise one or more of: a packet type: routing information; a scheduler flow identifier which is used by the scheduler; and length information.

The packet type may indicate if the packet is a data packet, a credit packet, a configuration capsule, a barrier packet and/or any other suitable packet type.

In some embodiments the routing information may indicate how a packet should get from the source to the destination through the fabric or interface.

The network interface device streaming core may provide the basic network interface device in accordance with for example IP protocols. The streaming subsystem with network interface device with extension kernel allows the network interface device to provide functions depending on the context in which the network interface device is being used. For example the streaming subsystem with network interface device with extension kernel can provide support for specific programming languages not supported by the core. By way of example only, this may be P4 language and/or the like. The streaming subsystem with network interface device with extension kernel may allow for flow steering and/or acceleration functions to be performed.

The streaming subsystem with compute kernels may provide functions for the host. By way of example, this function may be an acceleration function or the providing of a key data base.

Reference is made to FIG. 10. FIG. 10 shows how the MDMA function 810 provides an interface to the host 930. The PCIe interface 904 of the MDMA function 810 is configured to interface with a PCIe interface 922 of the host.

As shown schematically in FIG. 10, there is an application 934 with a compute offload requirement. This application 934 thus offloads to the network interface device a function. This offloaded function may be provided by one or more streaming subsystems with computer kernels 806 and 808 such as previously described in relation to FIGS. 8 and 9.

As shown schematically in FIG. 10, there is a protocol processing stack 932 with at least a partial offload to the network interface device. This offloaded function may be provided by one or more streaming subsystems with computer kernels 806 and 808 such as previously described in relation to FIGS. 8 and 9. In other embodiments, the offloaded protocol function may at least partially be implemented by the streaming subsystem with network interface device extension kernels 804 such as previously described in relation to FIGS. 8 and 9.

There may of course be more than one application on the host device which is configured to offload at least a part of its functionality to the network interface device.

In some embodiments, the protocol processing stack may be such that there is no offload of functionality to the network interface device.

In some embodiments, each of the applications in the host and/or the protocol processing stack may be provided with a respective driver stack (not shown), each of which is attached to a different PCI function within the interface.

It should be appreciated that the arrangements shown in FIGS. 8, 9 and 10 may be used at least partially in conjunction with at least a part of any of the previous embodiments.

It should be appreciated that one or more of the slices discussed previously may be used in conjunction with the arrangement of FIGS. 8, 9 and 10.

One or more slices may be implemented by the FPGA and/or one or more slices may be implemented in ASIC.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device comprising:
an interface coupled to first network interface device circuitry, host interface circuitry, and host offload circuitry, the interface comprising a plurality of input ports and a plurality of output ports;
the first network interface device circuitry having at least one input port and at least one port configured to be coupled to respective ports of the interface;
the host interface circuitry configured to interface to a host device, said host interface circuitry having at least one input port and at least one output port configured to be coupled to respective ports of the interface, said host interface circuitry comprising a scheduler configured to schedule at least one of providing of data to the host device and receiving of data from the host; and
the host offload circuitry configured to perform an offload operation for the host device, said host offload circuitry having at least one input port and at least one output port configured to be coupled to respective ports of the interface,
wherein said interface is configured to allow at least one of:
data to be provided to said host interface circuitry from at least one of said first network device interface circuitry and said host offload circuitry and
data to be provided from said host interface circuitry to at least one of said first network interface device circuitry and said host offload circuitry.

2. A network interface device as claimed in claim 1, wherein said at least one input port and said at least one output port of the host offload circuitry are connected via the interface only to respective ports of said host interface circuitry.

3. A network interface device as claimed in claim 1, comprising second network interface device circuitry having at least one input port and at least one output port configured to be coupled to respective ports of the interface, said second network interface device circuitry configured to perform network interface device operations.

4. A network interface device as claimed in claim 3, wherein said second network interface device circuitry comprises at least one kernel.

5. A network interface device as claimed in claim 3, wherein said second network interface device circuitry is configured to perform at least one of: an accelerator function and a flow steering function.

6. A network interface device as claimed in claim 3, wherein said at least one input port and said at least one output port of the second network interface device circuitry are connected via the interface only to respective ports of said first network interface device circuitry.

7. A network interface device as claimed in claim 1, wherein said host offload circuitry comprises at least one kernel.

8. A network interface device as claimed in claim 1, wherein the host offload circuitry is configured to support a first component of an application, said application component being configured to at least one of provide data to and receive data from a second component of the application.

9. A network interface device as claimed in claim 8, wherein said second component of said application is provided by said host device.

10. A network interface device as claimed in claim 1, wherein first network interface device circuitry is configured to stream data directly to at least one of a kernel in said network interface device and a kernel in said host device.

11. A network interface device as claimed in claim 3, wherein first network interface device circuitry is configured to stream data to a destination comprising at least one of said second network interface device circuitry and said host device.

12. A network interface device as claimed in claim 3, wherein first network interface device circuitry is configured to receive data from a destination comprising at least one of said second network interface device circuitry and said host device.

13. A network interface device as claimed in claim 1, wherein said interface comprises a cross bar switch.

14. A network interface device as claimed in claim 1, wherein said host interface circuitry is configured to manage a plurality of queues of data.

15. A system comprising a host device and a network interface device, said network interface comprising:
an interface coupled to first network interface device circuitry, host interface circuitry, and host offload circuitry, the interface comprising a plurality of input ports and a plurality of output ports;
the first network interface device circuitry having at least one input port and at least one port configured to be coupled to respective ports of the interface;
the host interface circuitry configured to interface to the host device, said host interface circuitry having at least one input port and at least one output port configured to be coupled to respective ports of the interface, said host interface circuitry comprising a scheduler configured to schedule at least one of providing of data to the host device and receiving of data from the host; and the host offload circuitry configured to perform an offload operation for the host device, said host offload circuitry having at least one input port and at least one output port configured to be coupled to respective ports of the interface, wherein said interface is configured to allow at least one of:

data to be provided to said host interface circuitry from at least one of said first network device interface circuitry and said host offload circuitry and data to be provided from said host interface circuitry to at least one of said first network interface device circuitry and said host offload circuitry.

16. A system as claimed in claim 15, wherein said host comprises at least one of: at least one application; and a protocol processing function, a plurality of which are configured to offload at least a part of respective functionality to said network interface device.

17. A system as claimed in claim 16, wherein said host offload circuitry is configured to provide at least one of said offloaded respective functionality.

* * * * *